US010193826B2

(12) United States Patent
Fahim et al.

(10) Patent No.: US 10,193,826 B2
(45) Date of Patent: Jan. 29, 2019

(54) SHARED MESH

(71) Applicant: INTEL CORPORATION, Santa Clara, CA (US)

(72) Inventors: Bahaa Fahim, Santa Clara, CA (US); Yen-Cheng Liu, Portland, OR (US); Chung-Chi Wang, Sunnyvale, CA (US); Donald C. Soltis, Jr., Timnath, CO (US); Terry C. Huang, San Jose, CA (US); Tejpal Singh, Shrewsbury, MA (US); Bongjin Jung, San Ramon, CA (US); Nazar Syed Haider, Fremont, CA (US)

(73) Assignee: INTEL CORPORATION, Santa Clara, CA (US)

( * ) Notice: Subject to any disclaimer, the term of this patent is extended or adjusted under 35 U.S.C. 154(b) by 534 days.

(21) Appl. No.: 14/800,552

(22) Filed: Jul. 15, 2015

(65) Prior Publication Data

US 2017/0019350 A1    Jan. 19, 2017

(51) Int. Cl.
| | | |
|---|---|---|
| *H04L 12/933* | (2013.01) | |
| *H04L 12/937* | (2013.01) | |
| *G06F 13/40* | (2006.01) | |
| *G06F 11/10* | (2006.01) | |

(52) U.S. Cl.
CPC .......... *H04L 49/103* (2013.01); *H04L 49/254* (2013.01); *G06F 11/1064* (2013.01); *G06F 13/4022* (2013.01)

(58) Field of Classification Search
CPC ............ G06F 13/4022; G06F 11/1064; G06F 11/3024; G06F 12/0811; G06F 13/1652; G06F 2213/0038; G06F 9/5027; G06F 15/80
See application file for complete search history.

(56) References Cited

U.S. PATENT DOCUMENTS

| | | | |
|---|---|---|---|
| 6,686,759 B1 * | 2/2004 | Swamy | .......... G01R 31/318558 324/750.15 |
| 6,687,818 B1 | 2/2004 | Svenkeson et al. | |
| 6,754,757 B1 | 6/2004 | Lewis | |
| 2005/0084263 A1 | 4/2005 | Norman | |
| 2009/0168767 A1 | 7/2009 | Anders et al. | |
| 2011/0126209 A1 | 5/2011 | Housty | |

(Continued)

FOREIGN PATENT DOCUMENTS

| | | |
|---|---|---|
| WO | WO 2013/101086 A1 | 7/2013 |
| WO | WO 2013/105931 A1 | 7/2013 |

(Continued)

OTHER PUBLICATIONS

Notification of Transmittal of the International Search Report and the Written Opinion of the International Searching Authority issued for International Patent Application No. PCT/US2016/034840, dated Sep. 13, 2016, 13 pages.

*Primary Examiner* — Oussama Roudani
(74) *Attorney, Agent, or Firm* — Womble Bond Dickinson (US) LLP

(57) ABSTRACT

A shared mesh comprises a mesh station. The mesh station is used to couple to at least a first core component and a second core component. The mesh station includes a logic unit. The mesh station is shared by at least the first core component and the second core component. A memory is coupled to the mesh station.

12 Claims, 11 Drawing Sheets

(56) References Cited

U.S. PATENT DOCUMENTS

| | | |
|---|---|---|
| 2011/0161586 A1 | 6/2011 | Potkonjak et al. |
| 2014/0092732 A1* | 4/2014 | Mejia ..................... H04J 3/085 370/230 |
| 2015/0003247 A1 | 1/2015 | Mejia et al. |
| 2015/0006776 A1 | 1/2015 | Liu et al. |
| 2015/0039920 A1 | 2/2015 | Balasubramanian et al. |
| 2015/0058524 A1 | 2/2015 | Creta et al. |
| 2015/0139242 A1 | 5/2015 | Mejia |
| 2015/0261709 A1* | 9/2015 | Billi ..................... G06F 13/4022 710/316 |
| 2015/0293863 A1* | 10/2015 | Still ..................... G06F 12/1072 710/308 |

FOREIGN PATENT DOCUMENTS

| | | | |
|---|---|---|---|
| WO | WO 2013103339 A1 * | 7/2013 | ......... G06F 13/4022 |
| WO | WO 2014/209406 A1 | 12/2014 | |

* cited by examiner

SHARED MESH

FIELD

Embodiments described herein generally relate to a field of data processing systems, and in particular (but not exclusively) to interconnect systems.

BACKGROUND

Currently, multi-core architectures are used to address the demand for higher computing throughput. Typically, a multi-core processor includes two or more independent processing units ("cores") that read and execute program instructions. Typically, the cores are integrated onto an integrated circuit die, or onto multiple dies in a single chip package.

The cores and other components on a chip are interconnected using a communication network, e.g., an on-chip interconnect. Typically, the on-chip interconnect includes wire conductors and other transmission media to communicate data among processing and storage units on the chip. The dramatic rise in the number of the cores on a single chip has resulted in the growing complexity of the interconnect fabric.

Generally, a mesh interconnect fabric refers to a network topology in which each node (station) of the mesh relays data for the network. All mesh nodes cooperate in the distribution of data in the network. A mesh network whose nodes are all connected to each-other is a fully connected network. Fully connected networks have the advantages of security and reliability. However, in such networks, the number of connections, and therefore the cost, goes up rapidly as the number of nodes increases.

Currently, high bandwidth mesh interconnects consume a lot of power and chip area that increases the manufacturing cost.

BRIEF DESCRIPTION OF THE DRAWINGS

Embodiments of the invention may best be understood by referring to the following description and accompanying drawings that are used to illustrate embodiments of the invention. In the drawings.

DETAILED DESCRIPTION

Figure 1:
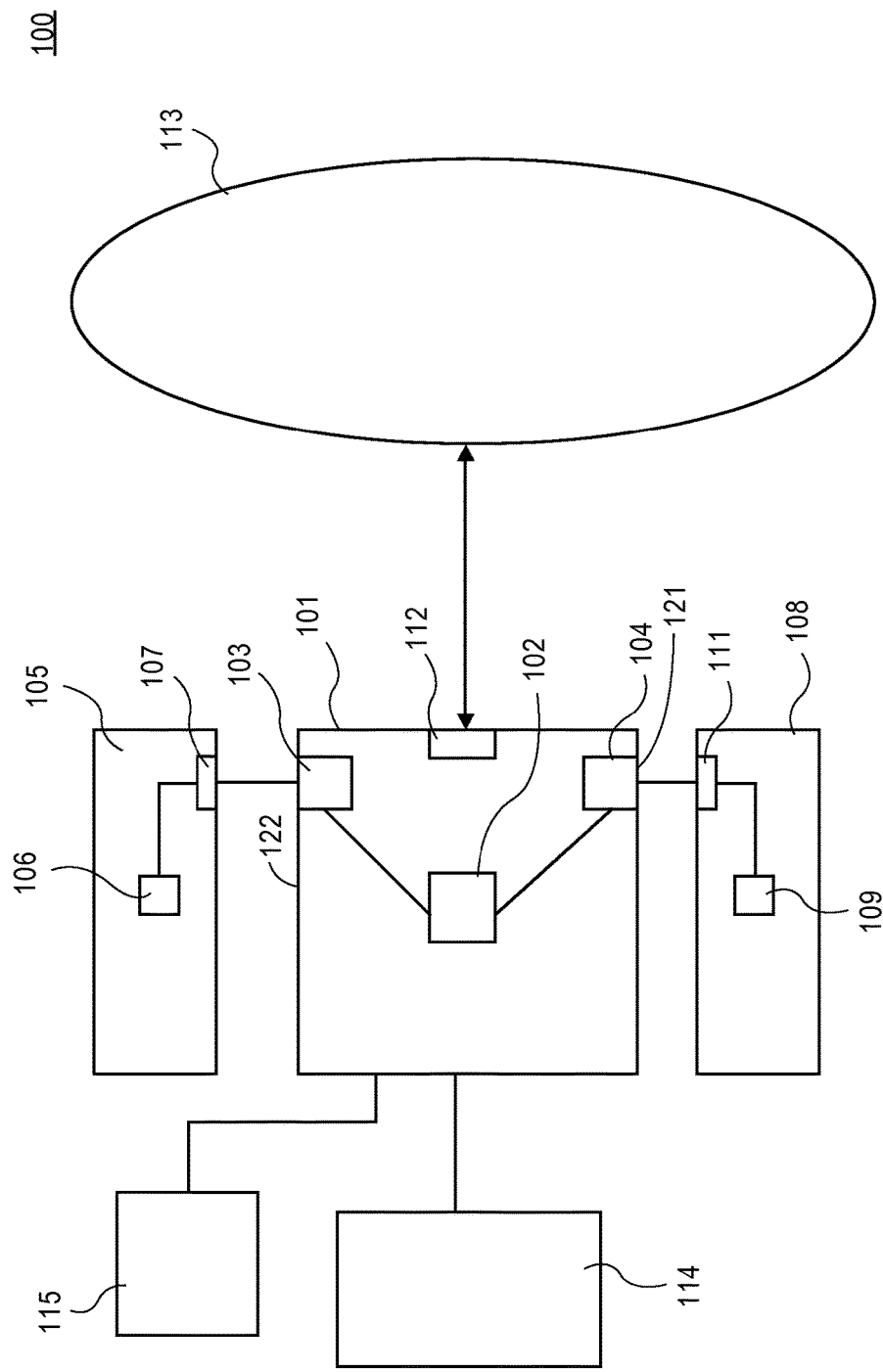
FIG. 1 is a view showing a block diagram of a shared mesh according to one embodiment.

Methods and apparatuses to provide a cost efficient shared mesh fabric are described herein. A shared mesh comprises a mesh station. The mesh station is used to couple to at least a first core component and a second core component. The mesh station includes a logic unit. The mesh station is shared by at least the first core component and the second core component. A memory is coupled to the mesh station.

In the following description, various aspects of the illustrative implementations will be described using terms commonly employed by those skilled in the art to convey the substance of their work to others skilled in the art. However, it will be apparent to those skilled in the art that the embodiments described herein may be practiced with only some of the described aspects. For purposes of explanation, specific numbers, materials and configurations are set forth in order to provide a thorough understanding of the illustrative implementations. However, it will be apparent to one skilled in the art that the embodiments of the present invention may be practiced without the specific details. In other instances, well-known features are omitted or simplified in order not to obscure the illustrative implementations.

Various operations will be described as multiple discrete operations, in turn, in a manner that is most helpful in understanding the embodiments of present invention, however, the order of description should not be construed to imply that these operations are necessarily order dependent. In particular, these operations need not be performed in the order of presentation.

While certain exemplary embodiments are described and shown in the accompanying drawings, it is to be understood that such embodiments are merely illustrative and not restrictive, and that the embodiments are not restricted to the specific constructions and arrangements shown and described because modifications may occur to those ordinarily skilled in the art.

Reference throughout the specification to "one embodiment", "another embodiment", or "an embodiment" means that a particular feature, structure, or characteristic described in connection with the embodiment is included in at least one embodiment. Thus, the appearance of the phrases, such as "one embodiment" and "an embodiment" in various places throughout the specification are not necessarily all referring to the same embodiment. Furthermore, the particular features, structures, or characteristics may be combined in any suitable manner in one or more embodiments.

Moreover, inventive aspects lie in less than all the features of a single disclosed embodiment. Thus, the claims following the Detailed Description are hereby expressly incorporated into this Detailed Description, with each claim standing on its own as a separate embodiment. While the exemplary embodiments have been described herein, those skilled in the art will recognize that these exemplary embodiments can be practiced with modification and alteration as described herein. The description is thus to be regarded as illustrative rather than limiting.

A central processing unit (CPU) on-die interconnect can be used for server designs and client designs. Typically, the server designs are based on a mesh coherent interconnect (e.g., half-rings of half-rings) which provides a high bandwidth, low latency fabric for on-die communication. The client design mesh interconnects are based on a ring interconnect. The server design mesh coherent interconnect is flexible and highly scalable to support a large number of cores and system agents. Typically, the CPU on-die interconnect provides a low latency fabric and sufficient bandwidth to scale for a limited number of cores and system agents. Generally, the mesh coherent interconnect provides the consistency of shared resource data that are stored in multiple local memories (e.g., caches).

Generally, core components refer to the components of the processor involved in executing instructions, e.g., an arithmetic logic unit (ALU), a floating point unit (FPU) and other executing instructions logic units. Uncore components refer to the components that are not in the core. Uncore components include e.g., interconnect controllers, a snoop agent pipeline, an on-die memory controller and a peripheral controller. An uncore interface to the core interfaces with a Last Level Cache (LLC) and is responsible for managing cache coherency. The LLC is a highest-level cache, which is called before accessing a memory. To converge uncore designs and share a common coherent interconnect, the server mesh scalable coherent interconnect for all server designs (including microservers) needs to be used. Current mesh interconnects, however, do not meet microserver cost targets due to area and power impacts associated with mesh agents which are designed to a high degree of scalability, while providing higher than required interconnect bandwidth for certain segments of the chip.

Embodiments of the shared mesh coherent fabric described herein provide an area efficient solution for scaling the mesh interconnect fabric to meet more efficient server cost targets. In one embodiment, an optional second intra die (IDI) interface is introduced per a mesh agent on a scalable coherent fabric to connect an additional core to a mesh station that serves as a mesh stop, as described in further detail below. In one embodiment, the second IDI interface is a core-uncore interface, as described in further detail below. That is, a mesh agent is generated that has floorplan options to support one or two IDI ports. The second IDI interface of the mesh agent to connect to the additional core advantageously reduces the area of the baseline mesh design. The second IDI interface of the mesh agent to connect to the additional core provides an advantage of combining 1:1 and 2:1 tiles that significantly increases the floorplan flexibility and optimizes overall cost, power and die area.

In one embodiment, a second IDI port is introduced that shares existing ADD/DROP ports on a mesh station that acts as a common mesh stop. Instead of having a dedicated mesh stop per a core, the second IDI port that shares existing ADD/DROP ports on a common mesh stop reduces a mesh overhead through sharing mesh stops. Depending on floorplan constraints this can reduce overall die area by at least about 10% to about 18% comparing with a conventional full mesh configuration.

FIG. 1 is a view showing a block diagram of a shared mesh 100 according to one embodiment. A mesh station 101 includes a logic unit 102, a port 103, a port 104 and a port 112. As shown in FIG. 1, the mesh station 101 is shared by a core component 105 and a core component 108. As shown in FIG. 1, core component 105 is reflected about the shared mesh station ("flipped") relative to core component 108. In one embodiment, the ports to connect to the mesh station are located at a predetermined side of the core components. When port 111 of core component 108 is connected to port 104 at a side 121 of mesh station 101, a core component 105 is flipped to connect port 107 to port 103 at a side 122 of mesh station 101, as shown in FIG. 1. In one embodiment, mesh station 101 is configurable to have one port connected to a core component or at least two ports connected to at least two components. In one embodiment, the logic unit 102 of mesh station 101 comprises a cache and home agent (CHA). In one embodiment, the CHA includes the functionality of a cache agent managing access to a system cache and a home agent managing access to a system memory, among other features. In one embodiment, the caching and home agent of the logic unit 102 is used to initiate transactions into a coherent memory, to retain copies in the cache structure, to provide copies of the coherent memory contents to other caching and home agents, to service coherent transactions, including handshaking, to maintain the coherency for a given address space of the memory. In one embodiment, logic unit 102 comprises an add logic, a drop logic, or both add and drop logics.

Port 103 is coupled to core component 105 and port 104 is coupled to core component 108. Port 112 is coupled to an interconnect fabric 113. In one embodiment, mesh station 101 is a part of the interconnect fabric 113. In one embodiment, interconnect fabric 113 connects components over a CPU die or any other chip. In one embodiment, interconnect fabric 113 is used to communicate data between agents to perform one or more functions. In one embodiment, interconnect fabric 113 comprises a matrix of mesh stations interconnected to each other. In one embodiment, mesh station 101 is one of the mesh stations of interconnect fabric 113. In one embodiment, mesh station 101 is a common mesh stop (CMS) for the components (e.g., cores, memories, memory controllers, buffers and other components of a network) to connect to the fabric 113. Generally, interconnect fabric 113 carries a coherent traffic and non-coherent traffic. In one embodiment, interconnect fabric 113 is a shared mesh coherent interconnect fabric.

Core component 105 has a logic unit 106 and a port 107. Core component 108 has a logic unit 109 and a port 111. A memory 114 is coupled to the mesh station 101. In one embodiment, memory 114 is a cache. In one embodiment, memory 114 is a cache slice. In more specific embodiments, memory 114 is a LLC cache. In alternative embodiments, memory 114 is a level one (L1) cache, a level two (L2) cache, or any other level cache. In one embodiment, memory 114 is shared by at least core components 105 and 108.

A memory controller 115 is coupled to mesh station 101, as shown in FIG. 1. In one embodiment, the logic unit 102 is used to send data to interconnect fabric 113 and to receive data from interconnect fabric 113. In one embodiment, logic unit 102 comprises a processor, or other logic. In one embodiment each of the logic units 106 and 109 comprises a processor, an arithmetic logic unit (ALU), a floating point unit (FPU), other executing instructions logic units, or any combination thereof. In one embodiment, each of the core components 105 and 108 comprises a core agent to perform one or more core component functions. Generally, an agent refers to a set of instructions, an application, or any other computer program stored in a memory and executed by the logic unit to perform one or more functions.

In one embodiment, each of port 103 and port 104 comprises an IDI interface. In one embodiment, the IDI interface of each of the ports 103 and 104 is a core-uncore interface to connect a core component with one or more uncore components. In one embodiment, mesh station 101 comprises an uncore component. In one embodiment, ports 103 and 104 are a part of a multiplexer coupled to an add port. In one embodiment, mesh station 101 comprises one or more buffers. In one embodiment, ports 103 and 104 are part of a demultiplexer coupled to a drop port, as described in further detail below with respect to FIGS. 5 and 10.

In one embodiment, logic unit 102 is configured to identify each of the core component 105 and the core component 108 that share the mesh station. In one embodiment, each of the core components that share the mesh station are identified uniquely using encoding. That is, the traffic that passes through the shared mesh fabric carries data indicating a source agent (e.g., a core component, other agent) and a destination agent (e.g., a core component, or other agent). In one embodiment, to support a shared mesh topology the CHA of the mesh station encodes each of the cores separately in a snoop filter/last level cache core valid state with the same source mesh station. In one embodiment, each of the snoop filter/last level cache core valid states configured to encode a core which owns a particular cache slice (or a particular cache address) is matched with the same mesh station. In one embodiment, the snoop filter is a part of a cache. In one embodiment, the state of the cache that encodes a core that owns a cache line (or a cache address space) is mapped with a mesh station. In one embodiment, the logic unit 102 is configured to map an identifier associated with the core component 105 to a broadcast vector and to map an identifier associated with the core component 108 to a broadcast vector. The cores that share the mesh station are uniquely identified using mapping.

Figure 11:
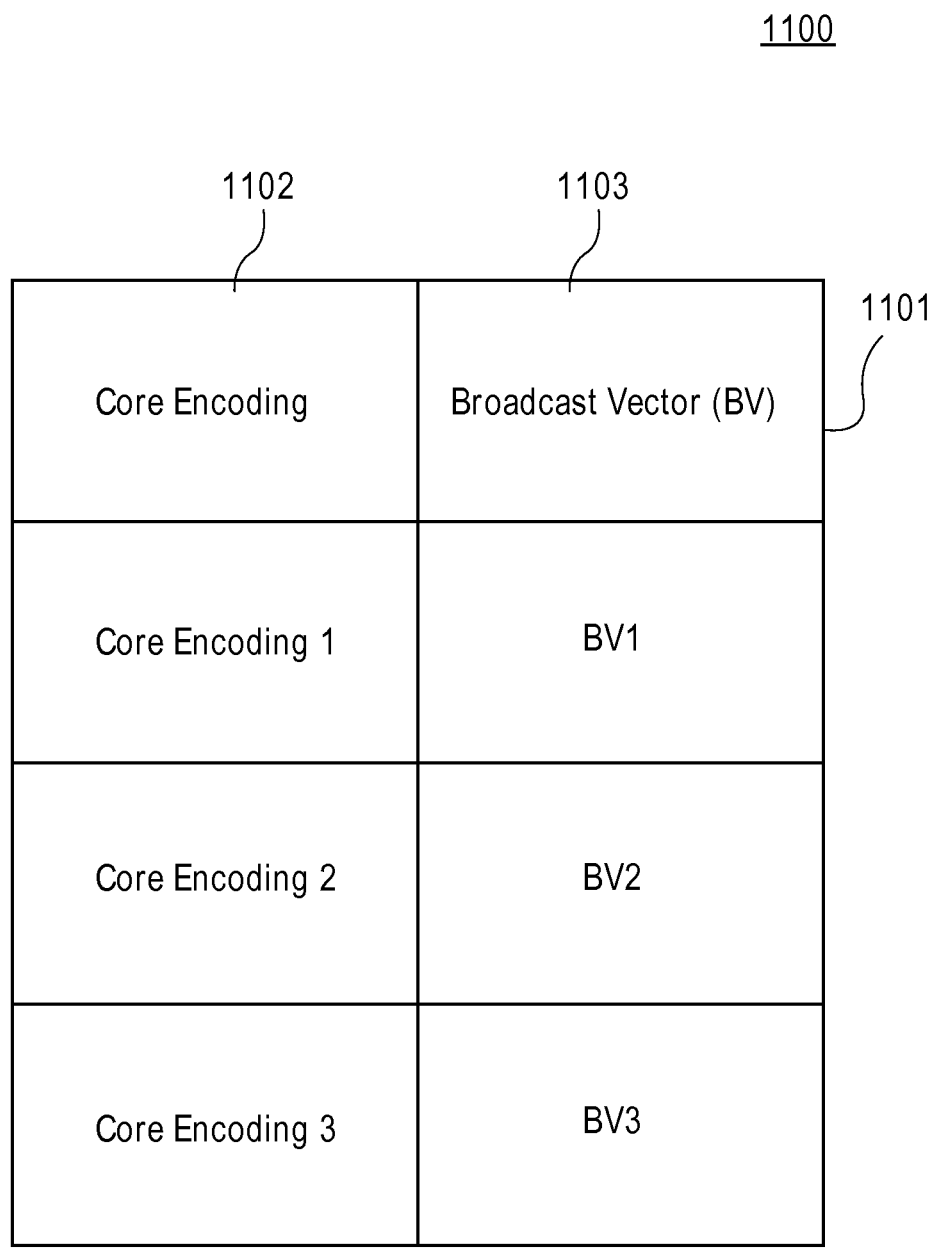
FIG. 11 is a view showing an exemplary data structure stored in a memory that maps an identifier associated with the core component to a broadcast vector according to one embodiment.

FIG. 11 is a view showing an exemplary data structure 1100 stored in a memory that maps an identifier associated with the core component (e.g., core encoding 1102) to an appropriate broadcast vector (BV) 1103 according to one embodiment. In one embodiment, the data structure 1100 is stored in memory 115. In one embodiment, the CHA of the mesh station maps each core component encoding in the core valid vector to the appropriate broadcast vector on an invalidate (IV) ring. In one embodiment, the IV ring is a snoop ring that targets the cores. In one embodiment, the shared mesh traffic includes a header that indicates which core behind the mesh station needs to be snooped based on the information in the core valid vector. In one embodiment, logic unit 102 is configured to adjust the size of the memory 114.

In one embodiment, the size of the memory 114 is increased to support multiple cores. In one embodiment, the memory 114 is an LLC that is increased in capacity to support the two core components. In one embodiment, the increase in capacity of the LLC is not proportional to the number of cores. In one specific embodiment, the capacity of the single LLC that supports two core components is smaller than the sum of the capacities of two LLCs that support the two components respectively. In another specific embodiment, the capacity of the single LLC that supports two components is greater than the sum of the capacities of two LLCs that support the two components respectively. In another embodiment, the memory allocation is increased to support multiple cores. In one embodiment, to maintain an effective neutral snoop filter (SF) and LLC capacity, each mesh station CHA provides a parametrizable option to increase SF/LLC to support multiple cores. This, however, does not result in increased latency over the equivalent full-mesh design. In one embodiment, one or more parameters indicating a portion of the memory (e.g., a number of memory units, way sets, or other memory units), a certain percentage of memory capacity, the memory allocation, or any combination thereof) that need to be added to support multiple core components are determined. The memory is adjusted based on the one or more parameters.

In one embodiment, the logic unit 102 is configured to determine credits for the first core component and the second core component. In one embodiment, the logic unit of the CMS changes the credits that are needed to be acquired for at least two cores before receiving messages. This ensures that the target decode of the core does not fall under the critical (performance) path. In one embodiment, for the messages targeting a shared mesh station, credits are provided behind the shared mesh station toward each of the cores. Before receiving the message the shared mesh station does not know which core is targeted. The shared mesh station assumes that both cores are targeted and receives credits for both cores. The shared mesh station does not consume the credits until the shared mesh station receives a message that indicates a core which is targeted.

In one embodiment, cores (e.g., core components 105 and 108, or other core components) provide an ability to throttle issuance rate of Core->Uncore messages to every other clock. In one embodiment, the uncore component provides a skid buffer which allows multiplexing messages from both cores. This allows sharing a single port on the mesh stop, as described in further detail below.

Figure 2:
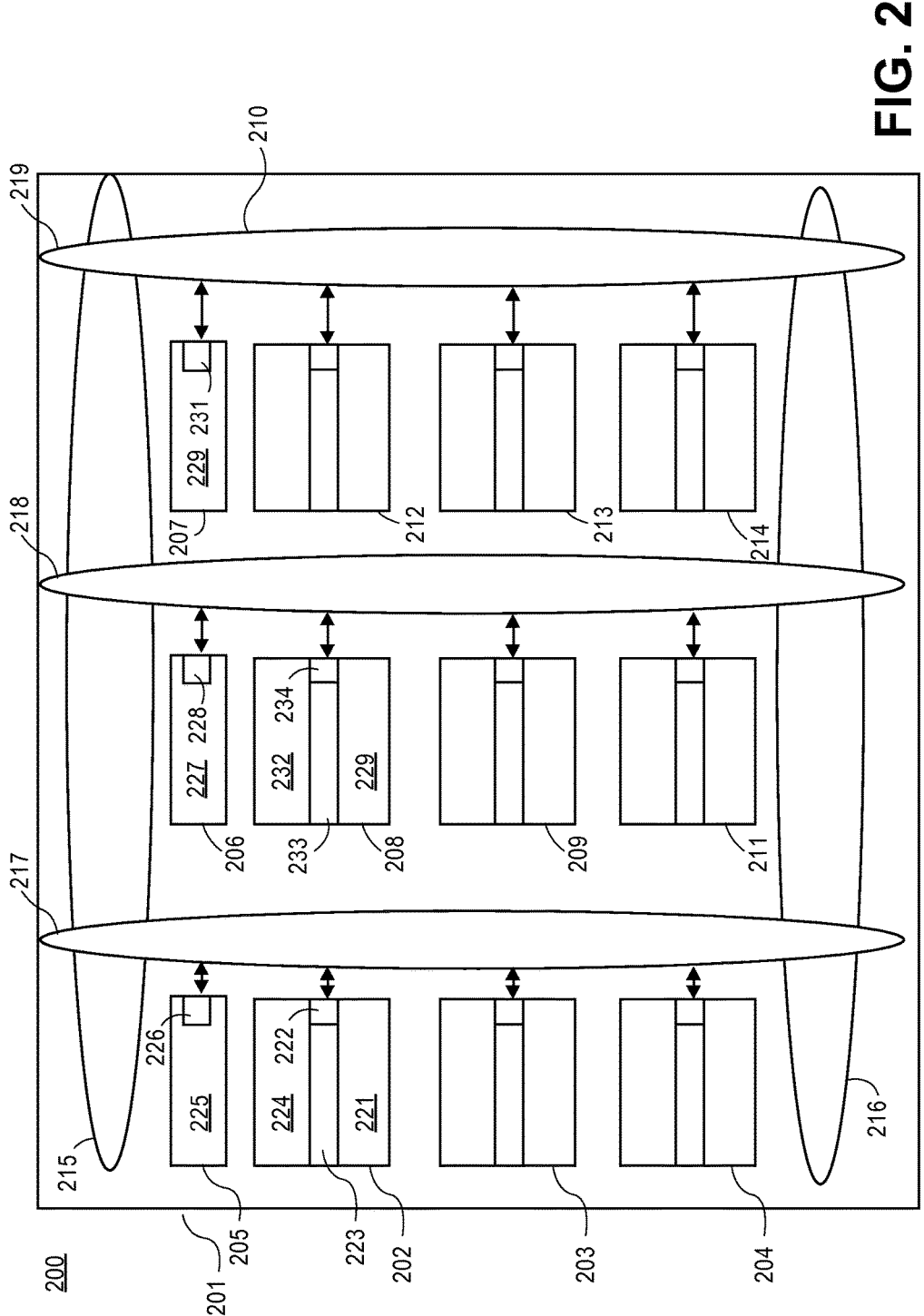
FIG. 2 is a block diagram illustrating a shared mesh interconnect system on a die according to one embodiment.

FIG. 2 is a block diagram 200 illustrating a shared mesh interconnect system on a die 201 according to one embodiment. As shown in FIG. 2, a plurality of tiles, such as tiles 202, 203, 204, 205, 206, 207, 208, 209, 211, 212, 213 and 214 are coupled to portions of a shared mesh interconnect fabric 210 formed on a die 201. Shared mesh interconnect fabric 210 comprises a plurality of ring interconnect portions extending in a plurality of directions, as shown in FIG. 2. For example, interconnect portions 215 and 216 extend in a horizontal direction. Interconnect portions 217, 218 and 219 extend in a vertical direction, as shown in FIG. 2. In one embodiment, the interconnect portions are ring interconnect portions. The plurality of tiles comprise system agent tiles, e.g., tiles 205 and 206, uncore component agent tiles, e.g., a tile 207, core component agent tiles, e.g., tiles 202 and 208. In one embodiment, the shared mesh interconnect system on die 201 includes a shared mesh coherent fabric.

Tile 205 comprises a system agent 225 coupled to a mesh station 226. Tile 206 comprises a system agent 227 coupled to a mesh station 228. In one embodiment, the system agent 225 is a coherent IC port, or other system agent. Tile 207 comprises an uncore agent 229 coupled to a mesh station 231. Tile 202 comprises a memory module 223 coupled to a mesh station 222, a core component 221 and a core component 224. Mesh station 222 is shared by core component 221 and core component 224, as shown in FIG. 2. In alternative embodiments, memory module 223 comprises a cache, a cache slice, a memory controller, a memory interface, or any combination thereof. In one embodiment, memory module 223 comprises one or more portions of a last level cache (LLC).

Tile 208 comprises a memory module 233 coupled to a mesh station 234, a core component 229 and a core component 232. Mesh station 234 is shared by core component 229 and core component 232, as shown in FIG. 2. In alternative embodiments, memory module 233 comprises a cache, a cache slice, a memory controller, a memory interface, or any combination thereof. In one embodiment, memory module 233 comprises one or more portions of a last level cache (LLC). In one embodiment, the mesh stations, such as mesh stations 222, 226, 228, 231 and 234 are mesh stops. In one embodiment, at least one of the mesh stations, e.g., mesh station 222, mesh station 234 represents mesh station 101.

In various embodiments, the tiles of the shared mesh on die 201 can include embedded DRAM controller (EDC), an external memory controller interface (EMI), memory controllers, interdevice interconnect components such as a Peripheral Component Interconnect (PCI) controller and QuickPath Interconnect (QPI) controller, among other examples.

As shown in FIG. 2, each of the mesh stations is coupled to the interconnect mesh to send and receive data. For example, mesh station 222 is coupled to mesh interconnect portion 217 to receive a message or other data from a source mesh station and send a message or other data to a destination mesh station. Each of the mesh stations 228 and 234 is coupled to mesh interconnect portion 218 to receive a message or other data from a source mesh station and send a message or other data to a destination mesh station. Mesh station 231 is coupled to interconnect portion 219 to receive a message or other data from a source mesh station and send a message or other data to a destination mesh station.

Figure 3:
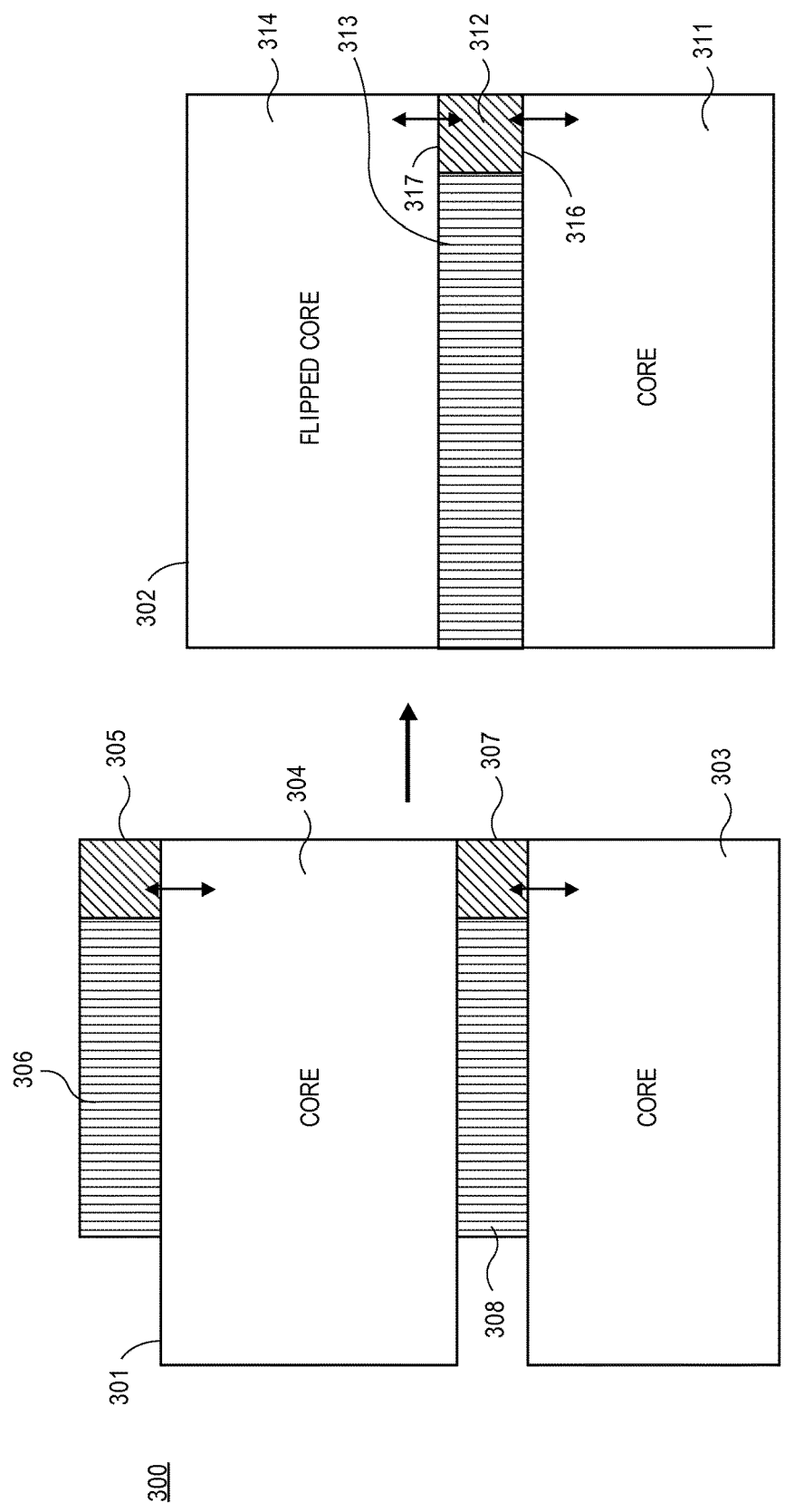
FIG. 3 is a view illustrating a portion of a conventional mesh system and a portion of a shared mesh system according to one embodiment.

FIG. 3 is a view 300 illustrating a portion of a conventional mesh system 301 and a portion of a shared mesh system 302 according to one embodiment. Conventional mesh system 301 comprises a core 303 and a core 304 on a die. A mesh station 305 and a cache 306 are attached to core 304. A mesh station 307 and a cache 308 are attached to core 304, as shown in FIG. 3. In the conventional mesh system 301 each mesh station is accessed only by one processing core. In the conventional mesh system 301 the mesh station is not shared by the plurality of processing cores.

Shared mesh system 302 comprises a mesh station 312 coupled to a core component 311 via an interface 316 and coupled to a core component 314 via an interface 317. Access to the mesh station 312 is shared by core component 311 and core component 314. In one embodiment, mesh station 312 represents mesh station 101. Core component 311 represents core component 108. Core component 314 represents core component 105.

A memory 313 is coupled to mesh station 312 and core components 311 and 314. Memory 313 is shared by core components 311 and 314. As shown in FIG. 3, core component 314 is flipped relative to the core component 311. In one embodiment, memory 313 is a cache. In more specific embodiment, memory 313 is a LLC. In one embodiment, memory 313 represents memory 114. As shown in FIG. 3, shared mesh system 302 consumes substantially less space comparing with conventional mesh system 301. A number of mesh stations in the shared mesh system is reduced by at least a factor of two comparing with the conventional mesh system that advantageously reduces electrical power consumed by the mesh system. The size of the shared memory 313 is adjusted to support two core components 311 and 314. As shown in FIG. 3, the size of the memory 313 is slightly increased to support two core components. In one embodiment, the size of the memory 313 is increased by less than 50% to support two core components.

Figure 4:
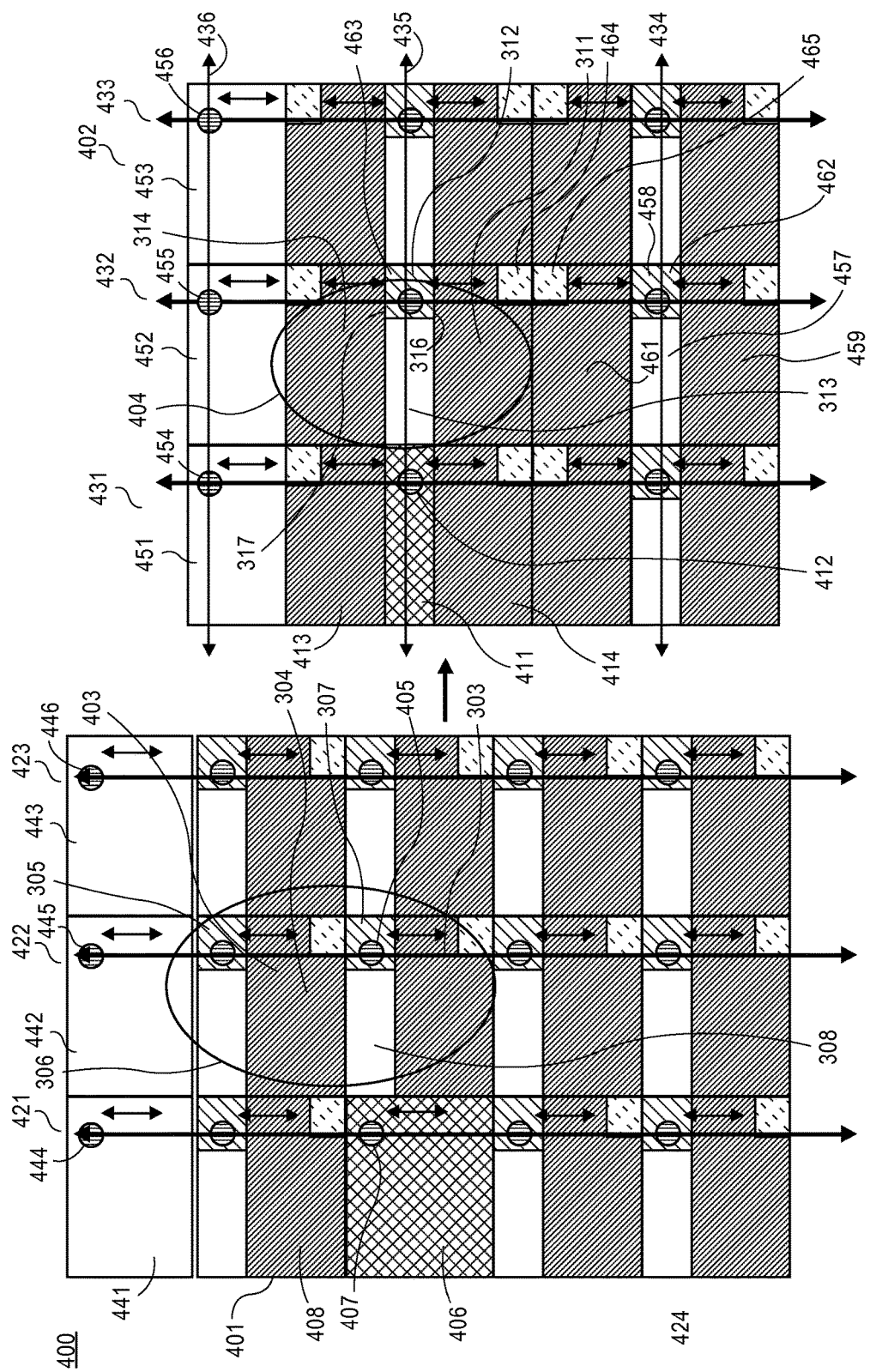
FIG. 4 is a floorplan view illustrating a portion of a conventional mesh system on a die and a portion of a shared mesh system on a die according to one embodiment.

FIG. 4 is a floorplan view 400 illustrating a portion of a conventional mesh system 401 on a die and a portion of a shared mesh system 402 on a die according to one embodiment. An insert 403 shows the portion of the conventional mesh system 301 and an insert 404 shows the portion of the shared mesh system 302 illustrated in FIG. 3. Conventional mesh system 401 comprises core components 408, 304 and 303, system components 441, 442 and 443, a memory controller 406, caches 306 and 308 coupled via corresponding mesh stations to mesh tracks 421, 422 and 423. Core component 303 is attached to mesh station 307, core component 304 is attached to mesh station 305. Memory controller 406 is has an interface with a mesh station logic 407. System component 441 interfaces with a mesh station 444, system component 442 interfaces with a mesh station 445 and system component 443 interfaces with a mesh station 446. Each of the core components is attached to a corresponding cache. Core component 304 interfaces with cache 306. Core component 303 interfaces with cache 308.

Shared mesh system 402 comprises a plurality of components, such as core components comprising core agents, system components comprising system agents, one or more memory controllers, one or more repeater blocks, one or more shared memories and one or more shared mesh stations. The core components, e.g., core components 311, 314, 413, 414, 459 and 461, the system components e.g., system components 451, 452 and 453, one or more memory controllers, e.g., a memory controller 411, one or more shared memories, e.g., memories 313 and 457, one or more repeater blocks, e.g., repeater blocks 464 and 465 are coupled via at least some shared mesh stations to mesh tracks extending in a plurality of directions. As shown in FIG. 4, the mesh tracks 431, 432 and 433 extend in a vertical direction and mesh tracks 434, 435, 436 extend in horizontal directions. In the shared mesh system 402, at least some of the mesh stations are shared between a plurality of components, e.g., system components, core components, one or more memory controller components, or any combination thereof. The mesh station 312 comprising a logic unit 463 is shared by at least core components 311 and 314, as described above. A mesh station 458 comprising a logic unit 462 is shared by at least core components 459 and 461. Memory controller 411 is coupled to have an interface with a mesh station logic 412. A system component comprising a system agent 451 is coupled to have an interface with a mesh station logic 454. A system component comprising a system agent 452 is coupled to have an interface with a mesh station logic 455. A system component comprising a system agent 453 is coupled to have an interface with a mesh station logic 456, as shown in FIG. 4. In one embodiment, the one or more repeater blocks (e.g., flip-flops, latches, or both) are configured to meet timing requirements for the data traffic on the mesh.

In one embodiment, at least some of the mesh stations, e.g., mesh station 458 are represented by mesh station 101. In one embodiment, at least some of the core components, e.g., core component 459 are represented by core component 108. In one embodiment, at least some other core components, e.g., core component 461 are represented by core component 105. In one embodiment, each of logic units 462 and 463 is represented by logic unit 102.

As shown in FIG. 4, shared memory 457 is coupled to mesh station 458 and core components 459 and 461. In one embodiment, at least some of the shared memories, e.g., memory 313 and memory 457 are represented by memory 114. As shown in FIG. 4, shared mesh system 402 consumes substantially less space comparing with conventional mesh system 401. A number of mesh stations in the shared mesh system 402 is reduced by at least a factor of two comparing with the conventional mesh system 401 that advantageously reduces electrical power consumed by the mesh system. The sizes of the shared memories are adjusted to support at least two core components, as described above.

Figure 5:
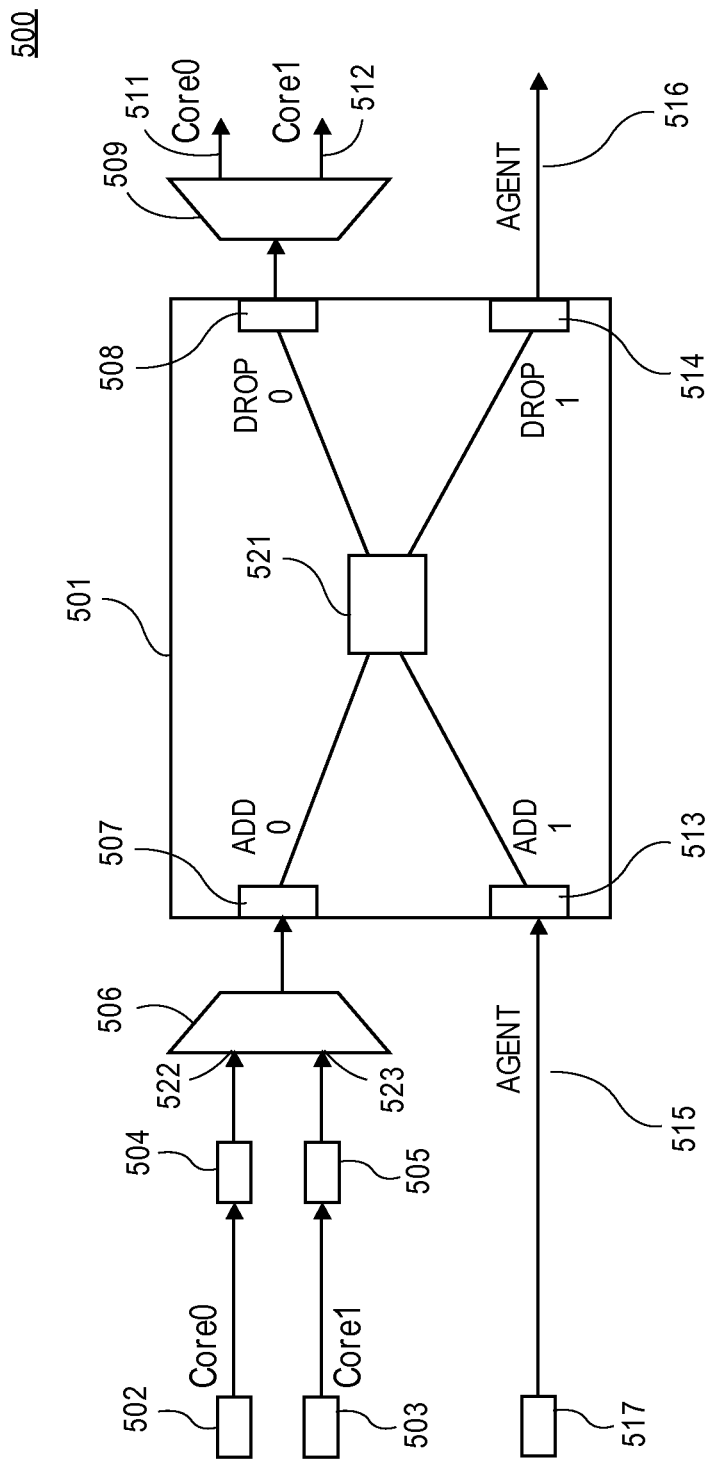
FIG. 5 is a block diagram of a portion of a shared mesh system according to one embodiment.

FIG. 5 is a block diagram of a portion of a shared mesh system 500 according to one embodiment. A mesh station 501 comprises a logic unit 521 coupled to an add port 0 507, an add port 1 513, a drop port 0 508 and a drop port 1 514. Generally, an add port provides an interface from a mesh agent to push a message onto the mesh fabric/interconnect. A drop port provides an interface for the mesh agent to receive a message from the mesh fabric that is destined to a target. The drop port uses information provided in the fields of the message to determine that a given target is the intended recipient of that message. The add port uses fields provided by a source agent including routing information, e.g., a source identifier, a target identifier, and other routing topology information to enable the mesh stop to successfully transport the message in accordance with the mesh interconnect routing rules. A multiplexer 506 is coupled to add port 0 507 to couple to at least a core component Core 0 502 and a core component Core 1 503. In one embodiment, core component 502 represents one of the components 105 and 108. In one embodiment, core component 503 represents one of the components 105 and 108. In one embodiment, mesh station 501 represents mesh station 101. In one embodiment, logic unit 521 represents logic unit 102.

A buffer 504 is coupled to an input 522 of multiplexer 506. A buffer 505 is coupled to an input 523 of multiplexer 506. In one embodiment, each of the buffer 504 and buffer 505 is a skid buffer to multiplex messages from at least two cores to share a single port on the mesh station. Multiplexer 506 is used to select one of the core component Core 0 502 and core component Core 1 503 from which to push the traffic data through the add port 507 based on a valid vector information (e.g., a valid request) from a source.

As shown in FIG. 5, traffic data from core component Core 0 502 transmitted via buffer 504 to input 522 and traffic data from core component Core 1 503 transmitted via buffer 505 to input 523 are multiplexed by multiplexer 506. The multiplexed data from the multiplexer 506 are sent to add port 507. In one embodiment, to avoid colliding messages from both cores Core 1 and Core 0 at add port 507 at the same clock period, messages from one of the Core 1 and Core 0 are deferred by at least one clock cycle while messages from another one of the Core 1 and Core 0 are passed through the mesh station. In one embodiment, each of the cores issues one or more messages to a shared mesh station every other clock cycle using the skid buffer. In one embodiment, the skid buffer is a one entry buffer/queue which stores the lower priority message for an additional clock cycle when collision occurs with another source contending for the same add port. In another embodiment, at least one additional add/drop ports is added to the shared mesh station to allow each of the cores to issue one or more messages to the shared mesh station every clock cycle without using the skid buffer.

A demultiplexer 509 is coupled to drop port 508. The traffic data transmitted via drop port 508 are demultiplexed by demultiplexer 509. Demultiplexer 508 is used to select which one of the core component Core 0 502 and core component Core 1 503 receives the traffic data sent through the drop port 508 based on a header information in the received message. The demultiplexed Core 0 data are transmitted through an output 511 of the demultiplexer. The demultiplexed Core 1 data are transmitted through an output 512 of the demultiplexer. Traffic data from a component agent 517 are input to add port 1 513 on a communication line 515. The component agent data are transmitted through drop port 1 514 on a communication line 516. In one embodiment, the component agent 517 is an uncore component agent. In another embodiment, the component agent 517 is a core component agent. In one embodiment, a memory cache (not shown) is coupled to mesh station 501.

In one embodiment, a memory controller (not shown) is coupled to mesh station 501, as described above.

Figure 6:
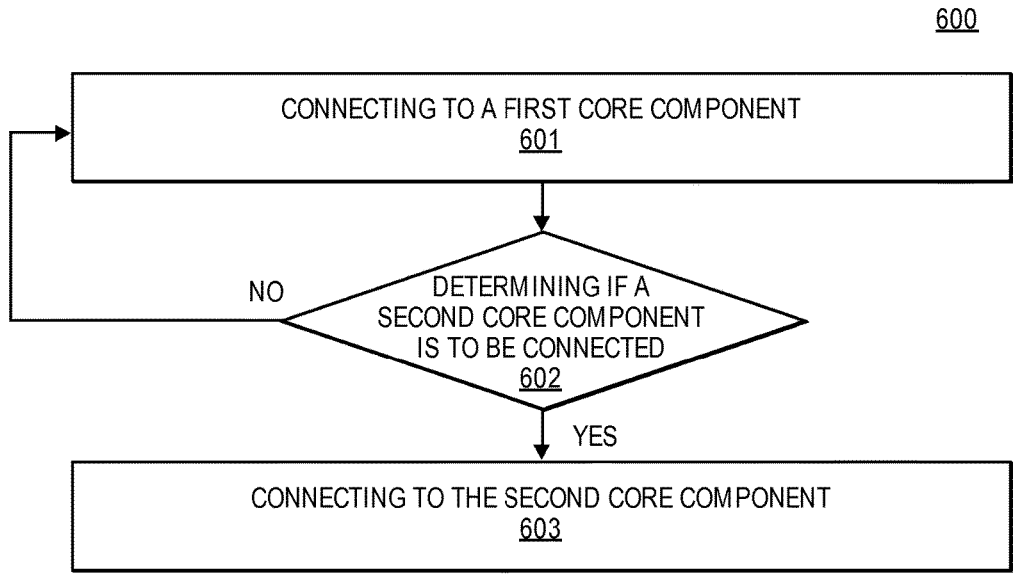
FIG. 6 shows a flowchart of a method to configure a shared mesh station according to one embodiment.

FIG. 6 shows a flowchart of a method 600 to configure a shared mesh station according to one embodiment. At operation 601 a first core component is connected to a first port of a mesh station. At operation 602 it is determined if a second core component is to be connected to a second port of the mesh station. If the second core component is to be connected, at operation 603 the second core component is connected to the second port of the mesh station. If the second core component is not to be connected, method 600 returns to operation 601. In one embodiment, each of the first port and the second port comprises an IDI interface, as described above. In one embodiment, each of the first port and the second port represents one of the ports of the mesh station, as described above.

Figure 7:
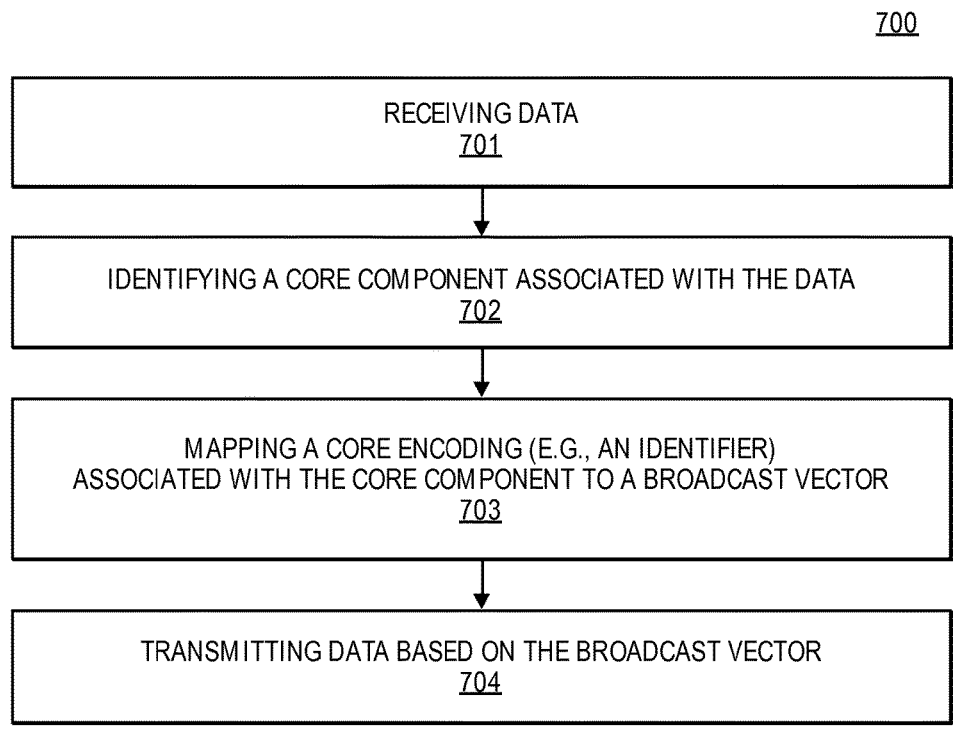
FIG. 7 shows a flowchart of a method to provide a shared mesh according to one embodiment.

FIG. 7 shows a flowchart of a method 700 to provide a shared mesh according to one embodiment. At operation 701 traffic data are received at a mesh station. At operation 702 a core component associated with the traffic data is identified, as described above. At operation 703 a core encoding (e.g., a core identifier) associated with the core component is mapped to a corresponding broadcast vector, as described above. At operation 704 the traffic data are transmitted based on the corresponding broadcast vector, as described above.

Figure 8:
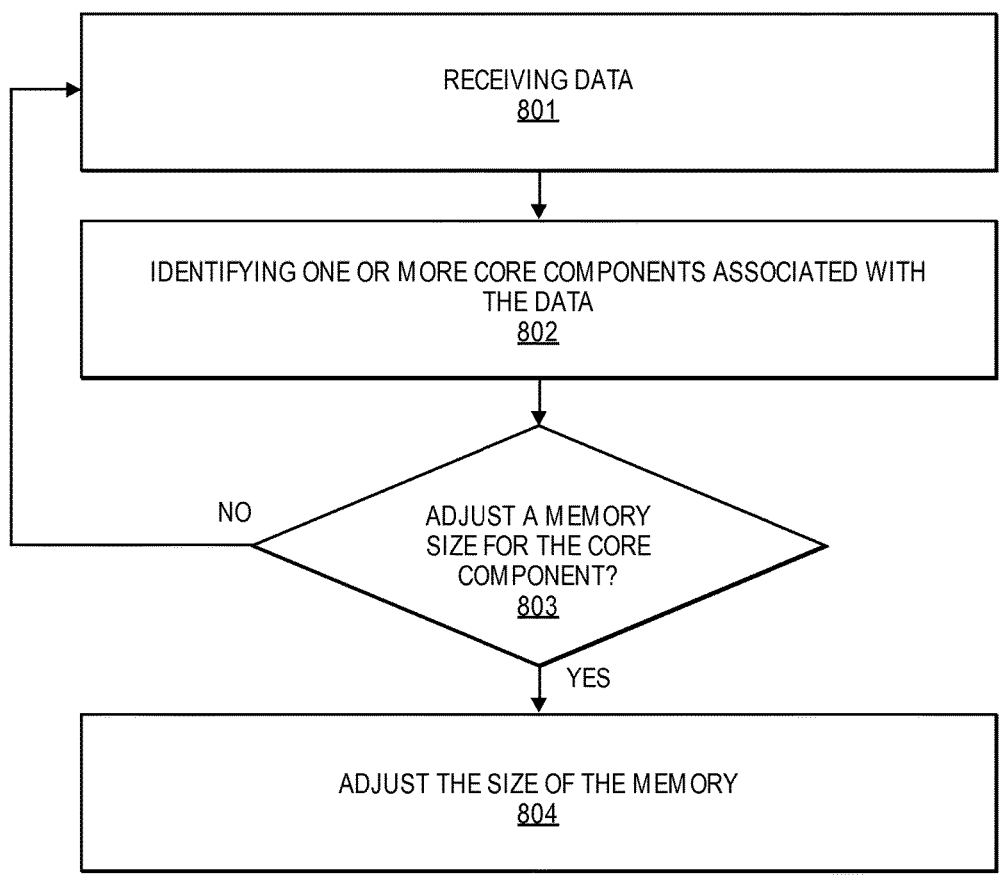
FIG. 8 shows a flowchart of a method to adjust a memory coupled to a shared mesh station according to one embodiment.

FIG. 8 shows a flowchart of a method 800 to adjust a memory coupled to a shared mesh station according to one embodiment. At operation 801 data are received at a shared mesh station. At operation 802 one or more core components associated with the data are identified, as described above. At operation 803 it is determined if a memory for the one or more core component is to be adjusted. If the memory is to be adjusted, the memory is adjusted at operation 804. In one embodiment, the size of the memory is adjusted. In one embodiment, one or more parameters indicating a portion of the memory that need to be added to support multiple core components are determined and the memory is adjusted based on the one or more parameters, as described above. If it is determined that the memory is not to be adjusted, method 800 returns to operation 801.

Figure 9:
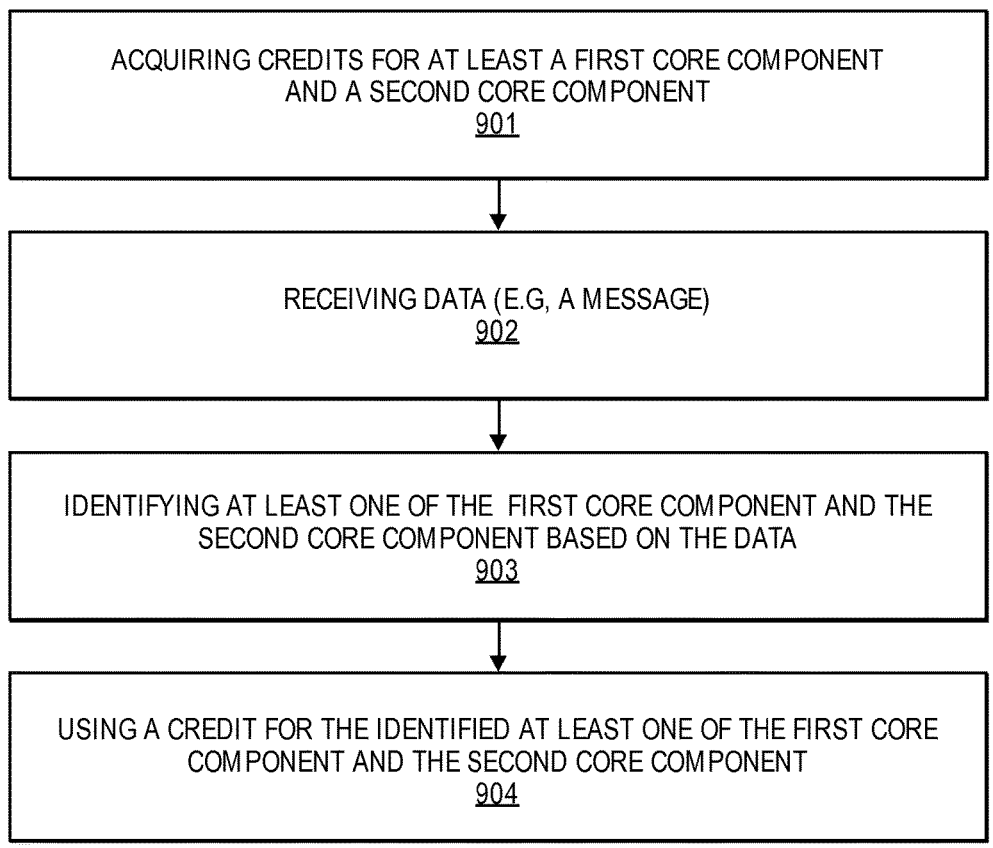
FIG. 9 shows a flowchart of a method to operate a shared mesh station according to one embodiment.

FIG. 9 shows a flowchart of a method 900 to operate a shared mesh station according to one embodiment. At operation 901 credits for at least a first core component and a second core component are acquired by a mesh station. At operation 902 data (e.g., a message, or other data) are received at the mesh station. In one embodiment, the mesh station changes needed to acquire credits for the first core component and the second core component before receiving the data, as described above. At operation 903 at least one of the first core component and the second core component is identified based on the data. At operation 904 a credit for the identified at least one of the first core component and the second core component is used.

Figure 10:
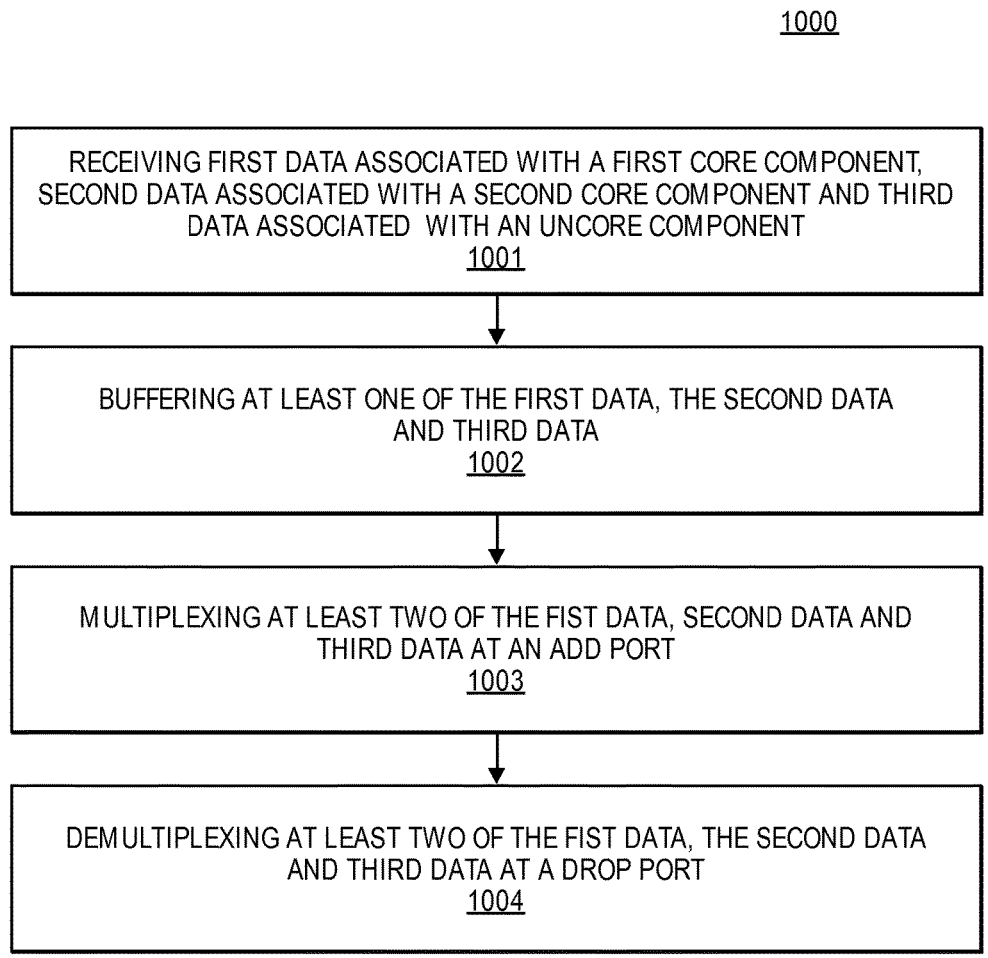
FIG. 10 shows a flowchart of a method to provide a shared mesh according to one embodiment.

FIG. 10 shows a flowchart of a method 1000 to provide a shared mesh according to one embodiment. At operation 1001 first data associated with a first core component, second data associated with a second core component and third data associated with an uncore component are received at a mesh station. At operation 1002 at least one of the first data, second data and third data are buffered. At operation 1003 at least two of the first data, second data and third data are multiplexed at an add port. At operation 1004 at least two of the first data, second data and third data are demultiplexed at a drop port, as described above.

Figure 12:
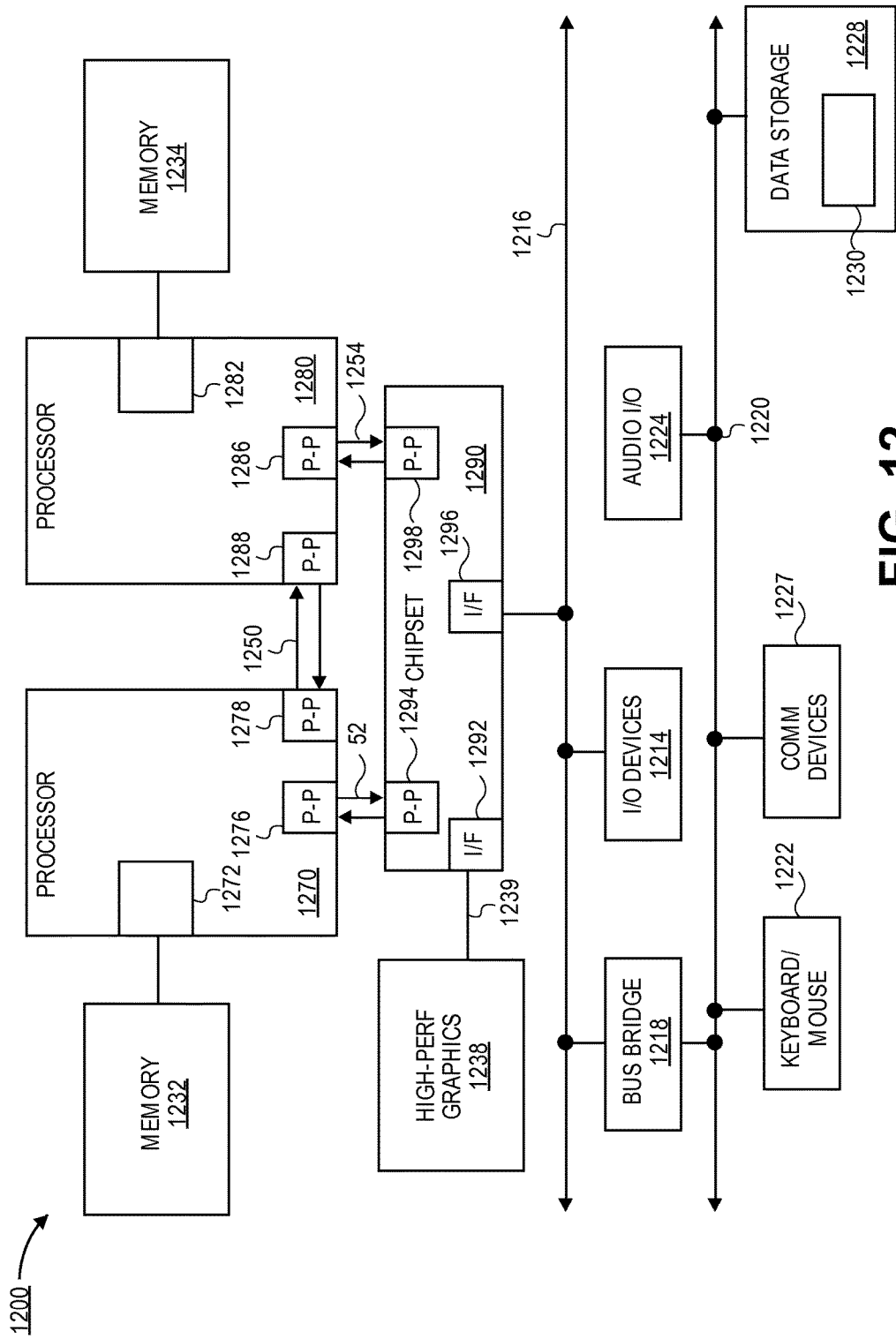
FIG. 12 is a block diagram of a multi-processor system according to one embodiment.

FIG. 12 is a block diagram of a multi-processor system 1200 according to one embodiment. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of a processor. In one embodiment, interconnects 1252 and 1254 are part of a serial, point-to-point coherent interconnect fabric. While shown with only two processors 1270, 1280, it is to be understood that the scope of the embodiments of the present invention is not so limited. In other embodiments, system 1200 comprises one or more additional processors.

Processors 1270 and 1280 are shown including integrated memory controller units 1272 and 1282, respectively. Processor 1270 includes point-to-point (P-P) interfaces 1276 and 1278. Processor 1280 includes P-P interfaces 1286 and 1288. Processors 1270, 1280 may exchange information via a P-P interconnect 1250 using P-P interfaces 1278, 1288. As shown in FIG. 12, IMCs 1272 and 1282 couple the processors to respective memories, e.g., a memory 1232 and a memory 1234. In one embodiment, memory 1232 and memory 1234 are portions of main memory locally attached to the respective processors.

Processors 1270, 1280 each exchange information with a chipset 1290 via P-P interconnects 1252, 1254 using point to point interfaces 1276, 1294, 1286, 1298. Chipset 1290 also exchanges information with a high-performance graphics unit 1238 via an interface 1292 along a high-performance graphics interconnect 1239.

A shared cache (not shown) may be included in either processor or outside of both processors; yet connected with the processors via a P-P interconnect, such that either or both processors' local cache information may be stored in the shared cache if a processor is placed into a low power mode. Chipset 1290 may be coupled to a bus 1216 via an interface 1296. In one embodiment, bus 1216 is a Peripheral Component Interconnect (PCI) bus, a PCI Express bus or another third generation I/O interconnect bus, although the scope of the embodiments of the present invention is not so limited. As shown in FIG. 12, I/O devices 1214, an audio input/output 1224 and a bus bridge 1218 are coupled to bus 1216. Bus bridge 1218 which couples bus 1216 to a bus 1220. In one embodiment, various devices are coupled to bus 1220 including, for example, a keyboard, a mouse, or both 1222, communication devices 1227 and a storage unit 1228 e.g., a disk drive or other mass storage device having stored thereon one or more sets of instructions (e.g., a software) and data 1230. Note that other architectures are possible, where the included components and interconnect architectures vary. For example, instead of the point-to-point architecture of FIG. 12, a system may implement a multi-drop bus or other such architecture. In alternative embodiments, the data processing system 1200 may be connected (e.g., networked) to other machines in a Local Area Network (LAN), an intranet, an extranet, or the Internet. The data processing system 1200 may operate in the capacity of a server or a client machine in a client-server network environment, or as a peer machine in a peer-to-peer (or distributed) network environment.

The data processing system 1200 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that data processing system. Further, while only a single data processing system is illustrated, the term "data processing system" shall also be taken to include any collection of data processing systems that individually or jointly execute a set (or multiple sets) of instructions to perform any one or more of the methodologies described herein.

Each of the processors 1270 and 1280 represents one or more general-purpose processing devices such as a microprocessor, central processing unit, or other processing device. More particularly, each of the processors 1270 and 1280 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Each of the processors 1270 and 1280 may also be one or more special-purpose processing devices such as an application specific integrated circuit (ASIC), a field programmable gate array (FPGA), a digital signal processor (DSP), network processor, or the like. Each of the processors 1270 and 1280 is configured to control a processing logic for performing the operations described herein with respect to FIGS. 1-11.

The data processing system 1200 may include a number of components. In one embodiment, these components are attached to one or more motherboards. In an alternate embodiment, these components are fabricated onto a single system-on-a-chip (SoC) die rather than a motherboard. The components in the data processing system 1200 include, but are not limited to, an integrated circuit die and at least one communication chip. In some implementations the communication chip is fabricated as part of the integrated circuit die. The integrated circuit die may include one or more processors, an on-die memory, often used as cache memory, that can be provided by technologies such as embedded DRAM (eDRAM) or spin-transfer torque memory (STTM or STTM-RAM).

Data processing system 1200 may include other components that may or may not be physically and electrically coupled to the motherboard or fabricated within an SoC die. These other components include, but are not limited to, a volatile memory (e.g., DRAM), a non-volatile memory (e.g., ROM or flash memory), a graphics processing unit (e.g., high-performance graphics unit 1238), a digital signal processor, a crypto processor (a specialized processor that executes cryptographic algorithms within hardware), a chipset, an antenna, a display or a touchscreen display, a touchscreen controller, a battery, or other power source, a power amplifier, a global positioning system (GPS) device, a compass, one or more sensors (that may include a power sensor to measure the power consumed by a node, power consumed by the system, or both; a motion sensor, or other sensor), a speaker, a camera, user input devices (e.g., I/O devices 1214, such as a keyboard, mouse, stylus, and touchpad), and a mass storage device (e.g. data storage 1228, such as hard disk drive, compact disk (CD), digital versatile disk (DVD), and so forth).

The communications chip enables wireless communications for the transfer of data to and from the data processing system. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip of the system 1200 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The data processing system 1200 may include a plurality of communication chips. For instance, a first communication chip may be dedicated to shorter range wireless communications such as Wi-Fi and Bluetooth and a second communication chip may be dedicated to longer range wireless communications such as GPS, EDGE, GPRS, CDMA, WiMAX, LTE, Ev-DO, and others. The term "processor" may refer to any device or portion of a device that processes electronic data from registers and/or memory to transform that electronic data into other electronic data that may be stored in registers and/or memory.

In various embodiments, the data processing system 1200 may be a laptop computer, a netbook computer, a notebook computer, an ultrabook computer, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the data processing system 1200 may be any other electronic device that processes data.

The storage unit 1228 may include a machine-accessible storage medium (or more specifically a computer-readable storage medium) on which is stored one or more sets of instructions and data 1230 embodying any one or more of the methodologies or functions described herein. The software may also reside, completely or at least partially, within the volatile memory, nonvolatile memory, on-die memory and/or within the one or more processors during execution thereof by the data processing system 1200, the on-die memory and the one or more processors also constituting machine-readable storage media. The one or more sets of instructions and data may further be transmitted or received over a network via a network interface device.

The term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the embodiments described herein. The term "machine-readable storage medium" shall accordingly be taken to include, but not be limited to, solid-state memories, and optical and magnetic media.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

The following examples pertain to further embodiments:

In one embodiment, a shared mesh comprises a mesh station comprising a logic unit to couple to at least a first core component and a second core component. The mesh station is shared by at least the first core component and the second core component. A memory is coupled to the mesh station.

In one embodiment, a shared mesh comprises a mesh station comprising a logic unit to couple to at least a first core component and a second core component. The mesh station is shared by at least the first core component and the second core component. A memory is coupled to the mesh station. A first port is to couple to the first core component. A second port is to couple to the second core component.

In one embodiment, a shared mesh comprises a mesh station comprising a logic unit to couple to at least a first core component and a second core component. The mesh station is shared by at least the first core component and the second core component. A memory is coupled to the mesh station. One of the first core component and the second core component is flipped.

In one embodiment, a shared mesh comprises a mesh station comprising a logic unit to couple to at least a first core component and a second core component. The mesh station is shared by at least the first core component and the second core component. A memory is coupled to the mesh station. The memory is a cache.

In one embodiment, a shared mesh comprises a mesh station comprising a logic unit to couple to at least a first core component and a second core component. The mesh station is shared by at least the first core component and the second core component. A memory is coupled to the mesh station. A memory controller is coupled to the mesh station.

In one embodiment, a shared mesh comprises a mesh station comprising a logic unit to couple to at least a first core component and a second core component. The mesh station is shared by at least the first core component and the second core component. A memory is coupled to the mesh station. The logic unit is to identify each of the first core component and the second core component.

In one embodiment, a shared mesh comprises a mesh station comprising a logic unit to couple to at least a first core component and a second core component. The mesh station is shared by at least the first core component and the second core component. A memory is coupled to the mesh station. The logic unit is to map a first identifier associated with the first core component to a first broadcast vector and a second identifier associated with the second core component to a second broadcast vector.

In one embodiment, a shared mesh comprises a mesh station comprising a logic unit to couple to at least a first core component and a second core component. The mesh station is shared by at least the first core component and the second core component. A memory is coupled to the mesh station. The logic unit is to adjust a size of the memory.

In one embodiment, a shared mesh comprises a mesh station comprising a logic unit to couple to at least a first core component and a second core component. The mesh station is shared by at least the first core component and the second core component. A memory is coupled to the mesh station. The logic unit is to determine credits for the first core component and the second core component.

In one embodiment, a shared mesh comprises a mesh station comprising a logic unit to couple to at least a first core component and a second core component. The mesh station is shared by at least the first core component and the second core component. A memory is coupled to the mesh station. The mesh station comprises a first add port and a first drop port. A multiplexer is coupled to the first add port. A buffer is coupled to the multiplexer. A demultiplexer is coupled to the first drop port.

In one embodiment, a shared mesh comprises a mesh station comprising a logic unit to couple to at least a first core component and a second core component. The mesh station is shared by at least the first core component and the second core component. A memory is coupled to the mesh station. The mesh station is to couple to an uncore component.

In one embodiment, a shared mesh system comprises a mesh station comprising a logic unit. A first add port is coupled to the logic unit. A first drop port is coupled to the logic unit. A multiplexer is coupled to the first add port to couple to at least a first core component and a second core component.

In one embodiment, a shared mesh system comprises a mesh station comprising a logic unit. A first add port is coupled to the logic unit. A first drop port is coupled to the logic unit. A multiplexer is coupled to the first add port to couple to at least a first core component and a second core component. A buffer is coupled to the multiplexer.

In one embodiment, a shared mesh system comprises a mesh station comprising a logic unit. A first add port is coupled to the logic unit. A first drop port is coupled to the logic unit. A multiplexer is coupled to the first add port to couple to at least a first core component and a second core component. A demultiplexer is coupled to the first drop port.

In one embodiment, a shared mesh system comprises a mesh station comprising a logic unit. A first add port is coupled to the logic unit. A first drop port is coupled to the logic unit. A multiplexer is coupled to the first add port to couple to at least a first core component and a second core component. A second add port is to couple to an uncore component. A second drop port is to couple to the uncore component.

In one embodiment, a shared mesh system comprises a mesh station comprising a logic unit. A first add port is coupled to the logic unit. A first drop port is coupled to the logic unit. A multiplexer is coupled to the first add port. The first core component is coupled to the multiplexer. The second core component is coupled to the multiplexer.

In one embodiment, a shared mesh system comprises a mesh station comprising a logic unit. A first add port is coupled to the logic unit. A first drop port is coupled to the logic unit. A multiplexer is coupled to the first add port to couple to at least a first core component and a second core component. One of the first core component and the second core component is flipped.

In one embodiment, a shared mesh system comprises a mesh station comprising a logic unit. A first add port is coupled to the logic unit. A first drop port is coupled to the logic unit. A multiplexer is coupled to the first add port to couple to at least a first core component and a second core component. A cache is coupled to the mesh station.

In one embodiment, a shared mesh system comprises a mesh station comprising a logic unit. A first add port is coupled to the logic unit. A first drop port is coupled to the logic unit. A multiplexer is coupled to the first add port to couple to at least a first core component and a second core component. A memory controller is coupled to the mesh station.

In one embodiment, a shared mesh system comprises a mesh station comprising a logic unit. A first add port is coupled to the logic unit. A first drop port is coupled to the logic unit. A multiplexer is coupled to the first add port to couple to at least a first core component and a second core component. The logic unit is to identify each of the first core component and the second core component.

In one embodiment, a shared mesh system comprises a mesh station comprising a logic unit. A first add port is coupled to the logic unit. A first drop port is coupled to the logic unit. A multiplexer is coupled to the first add port to couple to at least a first core component and a second core component. The logic unit is to map a first identifier associated with the first core component to a first broadcast vector and a second identifier associated with the second core component to a second broadcast vector.

In one embodiment, a shared mesh system comprises a mesh station comprising a logic unit. A first add port is coupled to the logic unit. A first drop port is coupled to the logic unit. A multiplexer is coupled to the first add port to couple to at least a first core component and a second core component. The logic unit is to adjust a size of the memory.

In one embodiment, a shared mesh system comprises a mesh station comprising a logic unit. A first add port is coupled to the logic unit. A first drop port is coupled to the logic unit. A multiplexer is coupled to the first add port to couple to at least a first core component and a second core component. The logic unit is to determine credits for the first core component and the second core component.

In one embodiment, a method to provide a shared mesh comprises identifying a first core component, mapping a first identifier associated with the first core component to a first broadcast vector and transmitting data based on the first broadcast vector.

In one embodiment, a method to provide a shared mesh comprises identifying a first core component, adjusting a size of a memory coupled to the first core component, mapping a first identifier associated with the first core component to a first broadcast vector and transmitting data based on the first broadcast vector.

In one embodiment, a method to provide a shared mesh comprises identifying a first core component, determining a credit for at least the first core component, mapping a first identifier associated with the first core component to a first broadcast vector, transmitting data based on the first broadcast vector.

In one embodiment, a method to provide a shared mesh comprises identifying a first core component, identifying a second core component, mapping a first identifier associated with the first core component to a first broadcast vector, mapping a second identifier associated with the second core component to a second broadcast vector, transmitting data based on the first broadcast vector and transmitting data based on the second broadcast vector.

In one embodiment, a method to provide a shared mesh comprises multiplexing data associated with the first core component and data associated with a second core component, identifying a first core component, mapping a first identifier associated with the first core component to a first broadcast vector and transmitting data based on the first broadcast vector.

In one embodiment, a method to provide a shared mesh comprises identifying a first core component, mapping a first identifier associated with the first core component to a first broadcast vector, demultiplexing data associated with the first core component and data associated with a second core component and transmitting data based on the first broadcast vector.

In one embodiment, a method to provide a shared mesh comprises buffering data associated with the first core component, identifying a first core component, mapping a first identifier associated with the first core component to a first broadcast vector and transmitting data based on the first broadcast vector.

In one embodiment, a non-transitory machine readable medium comprises instructions that cause a data processing system to perform operations comprising identifying a first core component, mapping a first identifier associated with the first core component to a first broadcast vector and transmitting data based on the first broadcast vector.

In one embodiment, a non-transitory machine readable medium comprises instructions that cause a data processing system to perform operations comprising identifying a first core component, adjusting a size of a memory coupled to the first core component, mapping a first identifier associated with the first core component to a first broadcast vector and transmitting data based on the first broadcast vector.

In one embodiment, a non-transitory machine readable medium comprises instructions that cause a data processing system to perform operations comprising identifying a first core component, determining a credit for at least the first core component, mapping a first identifier associated with the first core component to a first broadcast vector, transmitting data based on the first broadcast vector.

In one embodiment, a non-transitory machine readable medium comprises instructions that cause a data processing system to perform operations comprising identifying a first core component, identifying a second core component, mapping a first identifier associated with the first core component to a first broadcast vector, mapping a second identifier associated with the second core component to a second broadcast vector, transmitting data based on the first broadcast vector and transmitting data based on the second broadcast vector.

In one embodiment, a non-transitory machine readable medium comprises instructions that cause a data processing system to perform operations comprising multiplexing data associated with the first core component and data associated with a second core component, identifying a first core component, mapping a first identifier associated with the first core component to a first broadcast vector and transmitting data based on the first broadcast vector.

In one embodiment, a non-transitory machine readable medium comprises instructions that cause a data processing system to perform operations comprising identifying a first core component, mapping a first identifier associated with the first core component to a first broadcast vector, demultiplexing data associated with the first core component and data associated with a second core component and transmitting data based on the first broadcast vector.

In one embodiment, a non-transitory machine readable medium comprises instructions that cause a data processing system to perform operations comprising buffering data associated with the first core component, identifying a first core component, mapping a first identifier associated with the first core component to a first broadcast vector and transmitting data based on the first broadcast vector.

In one embodiment, a data processing system, comprises a memory and a processor coupled to the memory, wherein the processor is to identify a first core component, wherein the processor is to map a first identifier associated with the first core component to a first broadcast vector and wherein the processor is to transmit data based on the first broadcast vector.

In one embodiment, a data processing system, comprises a memory and a processor coupled to the memory, wherein the processor is to identify a first core component, wherein the processor is to adjust a size of a memory coupled to the first core component, wherein the processor is to map a first identifier associated with the first core component to a first broadcast vector and wherein the processor is to transmit data based on the first broadcast vector.

In one embodiment, a data processing system, comprises a memory and a processor coupled to the memory, wherein the processor is to identify a first core component, wherein the processor is to determine a credit for at least the first core component, wherein the processor is to map a first identifier associated with the first core component to a first broadcast vector and wherein the processor is to transmit data based on the first broadcast vector.

In one embodiment, a data processing system, comprises a memory and a processor coupled to the memory, wherein the processor is to identify a first core component, wherein the processor is to identify a second core component, wherein the processor is to map a first identifier associated with the first core component to a first broadcast vector, wherein the processor is to map a second identifier associated with the second core component to a second broadcast vector, wherein the processor is to transmit data based on the first broadcast vector and wherein the processor is to transmit data based on the second broadcast vector.

In one embodiment, a data processing system, comprises a memory and a processor coupled to the memory, wherein the processor is to multiplex data associated with the first core component and data associated with a second core component, wherein the processor is to identify a first core component, wherein the processor is to map a first identifier associated with the first core component to a first broadcast vector and wherein the processor is to transmit data based on the first broadcast vector.

In one embodiment, a data processing system, comprises a memory and a processor coupled to the memory, wherein the processor is to identify a first core component, wherein the processor is to map a first identifier associated with the first core component to a first broadcast vector, wherein the processor is to demultiplex data associated with the first core component and data associated with a second core component and wherein the processor is to transmit data based on the first broadcast vector.

In one embodiment, a data processing system, comprises a memory and a processor coupled to the memory, wherein the processor is to buffer data associated with the first core component, wherein the processor is to identify a first core component, wherein the processor is to map a first identifier associated with the first core component to a first broadcast vector and wherein the processor is to transmit data based on the first broadcast vector.

What is claimed is:

1. A shared mesh comprising:
   an interconnect fabric on a die;
   a plurality of tiles on the die coupled to the interconnect fabric, at least some of the plurality of tiles comprising
      a mesh station comprising
         a logic unit;
         a first port coupled to the logic unit;
         a second port coupled to the logic unit; and
         a third port coupled to the logic unit;
      a first core component coupled to the first port at a first side of the mesh station; and
      a second core component that is flipped relative to the first core component to connect to the second port at a second side of the mesh station that is opposite to the first side to reduce an area of the shared mesh,
   wherein the logic unit is configured to communicate data between the first core component and the interconnect fabric through the first port and the third port and wherein the logic unit is configured to communicate data between the second core component and the interconnect fabric through the second port and the third port; and a memory coupled to the mesh station that is shared by the first core component and the second core component, wherein the logic unit is to identify each of the first core component and the second core component, to map a first identifier associated with the first core component to a first broadcast vector and a second identifier associated with the second core component to a second broadcast vector and to determine credits for the first core component and the second core component.

2. The shared mesh of claim 1, wherein the logic unit comprises a cache and home agent, and wherein each of the first port and the second port is an intra die interface port.

3. The shared mesh of claim 1, wherein the memory is a cache.

4. The shared mesh of claim 1, further comprising a memory controller coupled to the mesh station.

5. The shared mesh of claim 1, wherein the mesh station comprises a first add port coupled to the logic unit and a first drop port coupled to the logic unit; and wherein the shared mesh further comprises
   a multiplexer coupled to the first add port;
   a buffer coupled to the multiplexer; and
   a demultiplexer coupled to the first drop port.

6. The shared mesh of claim 1, wherein each of the first port and the second port is a core-uncore interface port.

7. A method to provide a shared mesh, comprising
identifying a first core component by a logic unit of a mesh station that is a part of the shared mesh, wherein the shared mesh comprises an interconnect fabric on a die;
a plurality of tiles on the die coupled to the interconnect fabric, at least some of the plurality of tiles comprising the mesh station comprising
   the logic unit;
   a first port coupled to the logic unit;
   a second port coupled to the logic unit; and
   a third port coupled to the logic unit;
a first core component coupled to the first port at a first side of the mesh station; and
a second core component that is flipped relative to the first core component to connect to the second port at a second side of the mesh station that is opposite to the first side to reduce an area of the shared mesh, wherein the logic unit is configured to communicate data between the first core component and the interconnect fabric through the first port and the third port and wherein the logic unit is configured to communicate data between the second core component and the interconnect fabric through the second port and the third port; and
a memory coupled to the mesh station that is shared by the first core component and the second core component;
mapping a first identifier associated with the first core component to a first broadcast vector; and
transmitting data based on the first broadcast vector;
identifying the second core component;
mapping a second identifier associated with the second core component to a second broadcast vector; and
transmitting data based on the second broadcast vector.

8. The method of claim 7, further comprising
adjusting a size of the memory to support the first core component and the second core component.

9. The method of claim 7, further comprising
determining a credit for at least the first core component.

10. The method of claim 7, further comprising
multiplexing data associated with the first core component and data associated with the second core component.

11. The method of claim 7, further comprising
demultiplexing data associated with the first core component and data associated with the second core component.

12. The method of claim 7, further comprising
buffering data associated with the first core component.

* * * * *